Jan. 17, 1956 R. K. JANSEN 2,731,300
COW WASHER
Filed March 9, 1953
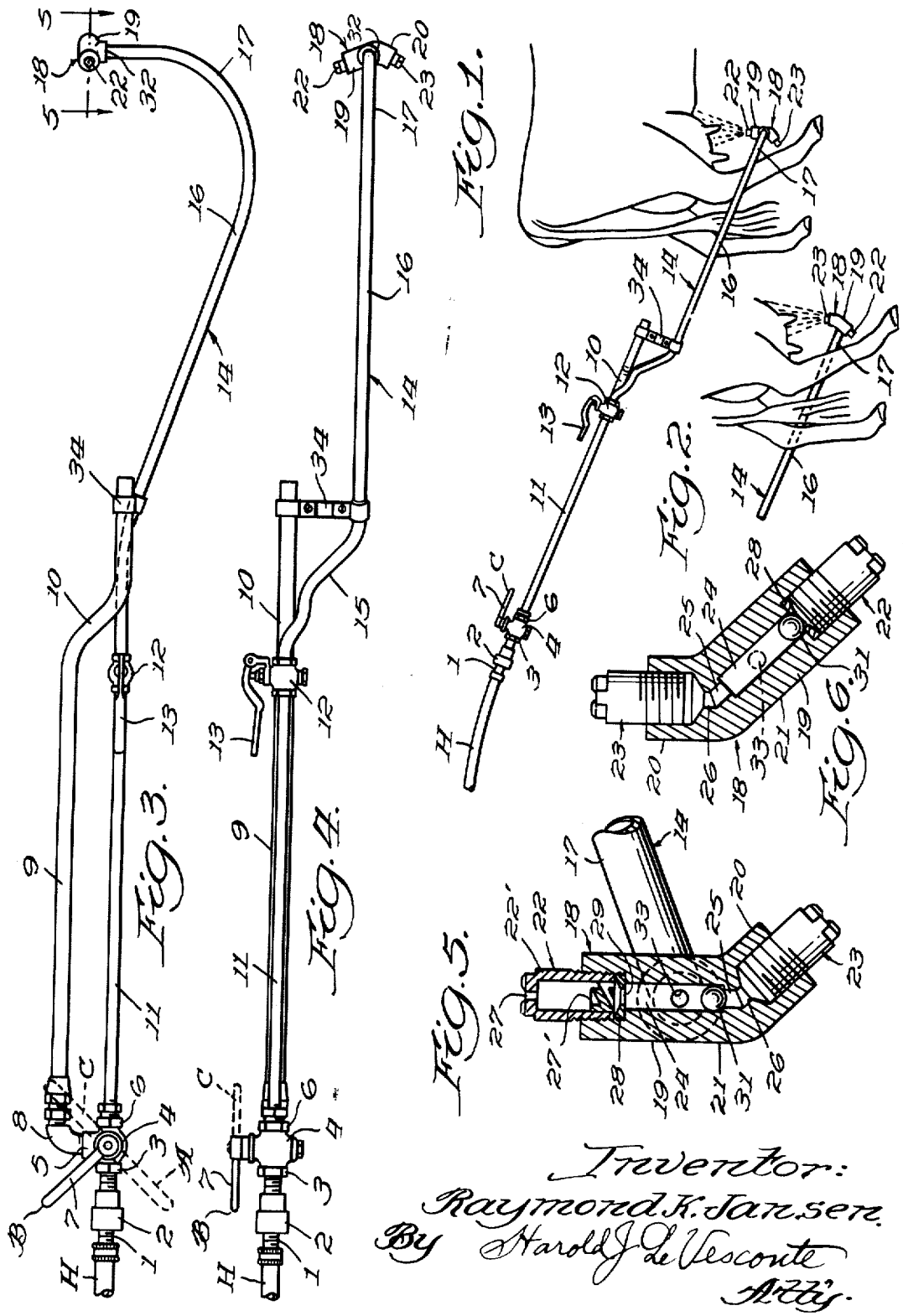

United States Patent Office 2,731,300
Patented Jan. 17, 1956

2,731,300
COW WASHER
Raymond K. Jansen, Ventura, Calif.
Application March 9, 1953, Serial No. 341,028
4 Claims. (Cl. 299—111)

This invention relates to dairy equipment and more particularly to a portable and dirigible apparatus for washing cows preliminary to milking them.

In modern dairy practice, health regulations require that each cow be washed over the flanks and udder before being milked; the milking operation commonly being by machine. The present practice is for the attendant to walk along the rear of a row of cows positioned in stanchions with a hose and to first rinse off the flanks of each cow and then to reach beneath the udder of each cow with the hose and wash or rather spray the udder to remove any loose dirt or chaff or the like before attachment of the milking machine.

The present invention is directed to a hose attachable device constructed and arranged to achieve the desired result more efficiently and with a saving of time, effort and water and the principal object of the invention is to provide a hose attachable nozzle means for washing cows before milking which is usable to wash both the flanks of the cow and to direct a spray of water upwardly against the udder from either side of the cow.

Another object of the invention is to provide a cow washing device having an udder washing nozzle means including opposed nozzles and means effective automatically effective to direct the flow of water only through that nozzle which is directed upwardly.

A further object of the invention is to provide a cow washing nozzle means including a flank washing nozzle and a pair of udder washing nozzles and manual means for selectively directing the flow of water to either the flank washing nozzle or to the udder washing nozzle means.

With the foregoing objects in view, together with such other objects and advantages as may subsequently appear, the invention resides in the parts, and in the construction, combination and arrangement of parts, disclosed by way of example, in the following specification of a representative mode of execution of the invention; reference being had to the accompanying drawings which form a part of said specification and in which drawings:

Fig. 1 is a side elevation of a cow washer embodying the invention, the device being shown in one position of use, Fig. 2 is a fragmentary view generally like Fig. 1, but showing the device in another position of use, Fig. 3 is an enlarged top plan view of the device, Fig. 4 is a side elevation shown in the same scale as Fig. 3, and Figs. 5 and 6 are greatly enlarged medial sectional views of the udder washing nozzle means taken on the line 5—5 of Fig. 3 but showing the arrangement of the parts when the device is held in the positions indicated in Figs. 1 and 2, respectively.

The illustrated embodiment of the invention includes inlet means comprising a hose coupling 1 and a swivel connection 2 to permit the device to be freely rotated while attached to a supply hose H. Connected to the opposite end of the swivel connection 2 is the inlet port 3 of a three-way plug cock 4 having outlet ports 5 and 6 and which is operated by a handle 7 which in position A (see Fig. 3) closes the inlet port 3, in position B it interconnects ports 3 and 5, and in position C, it interconnects ports 3 and 6. Extending from outlet port 5 is an elbow 8 disposed in the plane of the axial lines of the valve ports with the outlet end of the elbow disposed in the direction away from the inlet port 3. Attached to the elbow 8 is a tube 9 constituting the flank washing nozzle; said tube extending parallel to the axial line of the oppositely disposed ports 3 and 6 and adjacent the outlet end thereof is provided with a reverse bend 10 portion which brings the discharge end of said tube into said axial line.

The udder washing means comprises a tube 11 having one end thereof connected to the outlet port 6 of the valve 4 and extending in the axial line of said port to a point opposite the beginning of the reverse bend portion 10 of the tube 9. The distal end of the tube 11 is connected to the inlet port side of a normally spring closed valve 12 having an operating lever 13. The outlet port of the valve 12 is connected to one end of a tube 14 which through a series of reverse bends 15 extends to a run 16 which starts at a point directly beneath the distal end of the tube 9 and extends beyond said distal end in a plane parallel horizontal plane containing the axial line of the tube 11 and in a vertical plane disposed at an acute diverging angle to a vertical plane containing the axial line of the tube 11; said run terminating in a wide sweeping curved portion 17 connected to the distal end of which is the udder washing nozzle means 18 (see Figs. 3 and 4).

The nozzle means 18 comprises a hollow body member 19 of generally cylindrical form having one end 20 thereof extending at an included obtuse angle to the main portion 21 of the body member. The ends of the body member are internally threaded to receive spray nozzles 22 and 23 and the main portion of the body member is provided with an axial bore 24 somewhat smaller than the threaded bore for the spray nozzle 22 the inner end of which communicates through smaller bores 25 and 26 with the larger threaded bore in which the spray nozzle 23 is received at the bent end 20 of the body member.

The spray nozzles 22 and 23 are identical and a description of one will suffice for both. The nozzle has an exteriorly threaded hollow body member 22' having a relatively small discharge port 27 at the discharge end thereof and disposed within the interior of the body member is a sheet metal deflecting means 27' effective to impart rapid rotation to water entering the nozzle with resultant discharge of the water through the port 27 in the form of a spray. The nozzle devices 22 and 23 are a type available on the open market and more detailed description is not thought to be necessary. Interposed between the inner end of the nozzle 22 and the bottom of the threaded bore in which it is threaded is a washer 28 having a central opening 29 which is of approximately the same size as the diameter of the bore 25. The washer 28 and the opening 29 therein forms one seat for a ball valve element 31 freely movable in the bore 24; the juncture of the smaller bore 25 with the bore 24 at the opposite end of the bore 24 forming another seat for said ball valve element. The side of the body member 19 at about the mid length of the bore 24 is provided with an inlet port 32 connected to the distal end of the tube 14 and communicating with the bore 24 through an opening 33 which is of lesser diameter than the ball valve element 31. As best shown in Figs. 1 and 2, the nozzle means 18 is so disposed to the rest of the device that when in the position of use shown in Fig. 1 the nozzle 22 will be in a vertical position and when the device is rotated so as to bring the nozzle 23 uppermost, that nozzle will be in a vertical position. A strap clamp means 34 located at the distal end of the tube 9 and also secured to the tube 14 serves to hold the free ends of the tubes against displacement.

In use the device is first held in an approximately horizontal position and the water is directed through the tube 9 to wash down the flanks of the cows; the user walking along the rear of the row of cows and first thus washing the flanks on one side and then walking back and washing the flanks on the other side of the cows. The valve 4 is then turned to position C directing the water to the tube 11, valve 12, tube 14 and the udder washing means 18. By reason of the hook shape of the tube 14 and the position of the nozzle means thereon, the user standing approximately in rear of the cow can place one or the other of the nozzles 22 or 23 directly beneath the udder and by opening the valve 12 through pressure on the lever 13 can direct a spray of water upwards against the udder. If it is desired to use the device from the left hand side of the cow, the device is held as shown in Fig. 1 and if the device is to be used from the right hand side of the cow, the device is rotated 180° as shown in Fig. 2. In either position, the ball element 31 will drop to which ever end of the bore is lowermost and upon introduction of water it will shut off flow to the nozzle (22 or 23) that happens to be directed downwardly so that the device can be used in either position with assurance that only the upwardly directed nozzle will produce a spray.

While in the foregoing specification there has been described and illustrated one embodiment of the invention, it is appreciated that modifications will suggest themselves to others skilled in the art in the light of such disclosure. Therefore, it is not to be assumed that the invention is limited to the exact form thereof above disclosed and it will be understood that the invention includes all such modifications in the parts, and in the construction, combination and arrangement of parts as shall come within the purview of the appended claims.

I claim:

1. In a cow washing device, a three way valve having an inlet port adapted for connection to a supply hose, two outlet ports and manually operable means for interconnecting said inlet port with either of said inlet ports, a flank washing nozzle having one end thereof connected to one of said outlet ports, a conduit having one end thereof connected to the other of said outlet ports and extending generally parallel to said flank washing nozzle, a normally closed, manually operable valve means in said conduit, and an udder washing spray nozzle means at the distal end of said conduit; said spray nozzle means comprising a generally cylindrical hollow body member having an inlet port in the side thereof connected to the distal end of said conduit and having a pair of spray nozzles disposed one at each end thereof; said body and said nozzles being so angularly disposed relative to said conduit that when said conduit is positioned for use at an acute angle from the horizontal, the uppermost of said nozzles will be directed vertically upwardly; and gravity responsive valve means in said body member effective to permit the flow of water only through the uppermost of said spray nozzles.

2. In a cow washing device, a three way valve having an inlet port adapted for connection to a supply hose, two outlet ports and manually operable means for interconnecting said inlet port with either of said inlet ports, a flank washing nozzle having one end thereof connected to one of said outlet ports, a conduit having one end thereof connected to the other of said outlet ports and extending generally parallel to said flank washing nozzle, a normally closed, manually operable valve means in said conduit, and an udder washing spray nozzle means at the distal end of said conduit; said conduit extending beyond said flank washing nozzle and terminating in a curved portion effective to permit the udder washing spray nozzle means to be positioned beneath the udder of a cow by an operator standing in rear of the cow; said spray nozzle means comprising a generally cylindrical hollow body member having an inlet port in the side thereof connected to the distal end of said conduit and having a pair of spray nozzles disposed one at each end thereof; said body and said nozzles being so angularly disposed relative to said conduit that when said conduit is positioned for use at an acute angle from the horizontal, the uppermost of said nozzles will be directed vertically upwardly, and gravity responsive valve means in said body member effective to permit the flow of water only through the uppermost of said spray nozzles.

3. In a cow washing device, an elongated, rigid conduit means having a normally closed, manually operable valve means disposed intermediate its ends, swivel means for connecting one end of said conduit means to a supply hose adapted to permit said conduit means to be rotated about its longitudinal axis relative to the supply hose; the opposite end of said conduit means being formed in a wide sweeping curved portion terminating in an end extending transversely to the axis of rotation of said swivel means; said curved portion being of an extent sufficient to enable a user holding said device and standing in rear of a cow to position said last-named end beneath the udder of the cow with said curved portion extending past the legs of the cow on either side as may be preferred by rotation of said conduit means relative to the supply hose, nozzle means connected to said last-named end of said conduit means including a pair of oppositely disposed nozzles extending transversely to the longitudinal axis of the end of said conduit means to which said nozzles are connected and disposed so that in either position of use one of said nozzles will be directed toward the udder, and gravity responsive valve means interposed between said nozzles constructed and arranged to permit the flow of water only through the one of said nozzles that is directed upwardly incident to use of said device.

4. A cow washing device as claimed in claim 3 in which the said conduit means inclines downwardly from the point of holding by the user to a point adjacent the floor beneath the udder to be washed and in which said nozzles are so angularly disposed with respect to said conduit means that in either position of use, the uppermost of said nozzles will extend substantially vertically.

References Cited in the file of this patent

UNITED STATES PATENTS

| | | |
|---|---|---|
| 1,146,249 | Hargreaves | July 13, 1915 |
| 1,612,326 | Taylor | Dec. 28, 1926 |
| 1,728,455 | Taylor | Sept. 17, 1929 |
| 1,835,865 | Hansen | Dec. 8, 1931 |
| 2,571,583 | Kolback | Oct. 16, 1951 |

Dedication 2,731,300.—*Raymond K. Jansen*, Ventura, Calif. Cow Washer. Patent dated Jan. 17, 1956. Dedication filed Mar. 30, 1962, by the inventor.
Hereby dedicates to the public the entire remaining term of said patent.
[*Official Gazette May 8, 1962.*]